United States Patent [19]

Kuze

[11] 4,101,951
[45] Jul. 18, 1978

[54] VARIABLE CAPACITOR

[75] Inventor: Saburo Kuze, Kyoto, Japan

[73] Assignee: Murata Manufacturing Co., Ltd., Nagaokakyo, Japan

[21] Appl. No.: 709,372

[22] Filed: Jul. 28, 1976

[30] Foreign Application Priority Data

Jul. 28, 1975 [JP] Japan .......................... 50-104912[U]
Apr. 16, 1976 [JP] Japan ............................ 51-48273[U]

[51] Int. Cl.² ............................................ H01G 5/04
[52] U.S. Cl. .................................. 361/293; 361/278; 361/300
[58] Field of Search ................ 361/293, 321, 300, 278

[56] References Cited

U.S. PATENT DOCUMENTS

| 1,533,611 | 4/1925 | Respess | 361/293 |
|---|---|---|---|
| 2,475,144 | 7/1949 | Kodama | 361/293 |
| 2,654,060 | 9/1953 | Stovall | 361/300 |
| 3,287,613 | 11/1966 | Devins | 361/293 |
| 3,304,472 | 2/1967 | Sperry | 361/300 |
| 3,486,089 | 12/1969 | Wambach | 361/293 |
| 3,500,147 | 3/1970 | Hirschberg | 361/293 |
| 3,603,850 | 9/1971 | Kirschner | 361/321 |
| 3,656,033 | 4/1972 | Nikles | 361/293 |
| 3,953,771 | 4/1976 | Bremstahler | 361/293 |

FOREIGN PATENT DOCUMENTS

| 521,900 | 3/1921 | France | 361/300 |
|---|---|---|---|
| 2,011,884 | 9/1971 | Fed. Rep. of Germany | 361/293 |
| 937,395 | 9/1963 | United Kingdom | 361/293 |

Primary Examiner—Elliot A. Goldberg
Attorney, Agent, or Firm—Birch, Stewart, Kolasch & Birch

[57] ABSTRACT

A variable capacitor for use in electrical and electronic equipment which includes a stator disposed on an insulating base, a stator terminal lead having an electrode portion fixed to the stator and a terminal end extending through the insulating base. The variable capacitor includes a metallic rotor rotatably disposed on the stator through a dielectric plate, a rotor terminal lead having a resilient spring portion disposed on the rotor and a terminal end extending through the base, and an insulating cap of hollow cylindrical shape fitted over the resilient spring portion of the rotor terminal lead. The insulating cap is rigidly connected to the base to form the variable capacitor of compact size with sufficiently large electrostatic capacity.

13 Claims, 17 Drawing Figures

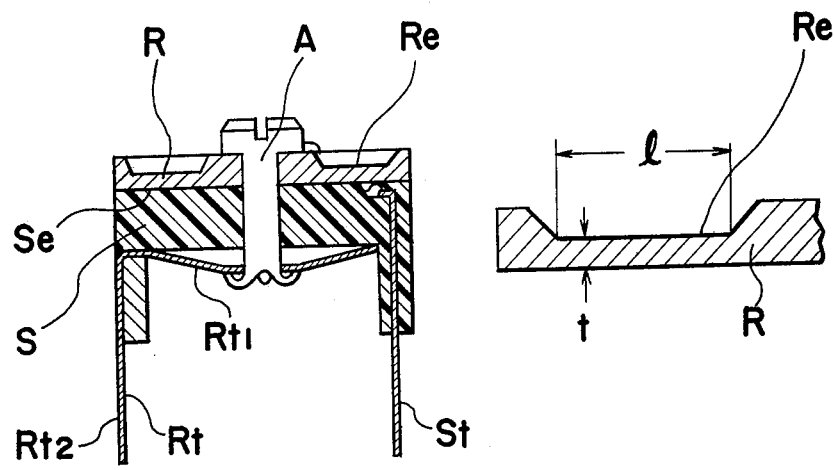
FIG. 1 Prior Art
FIG. 2 Prior Art
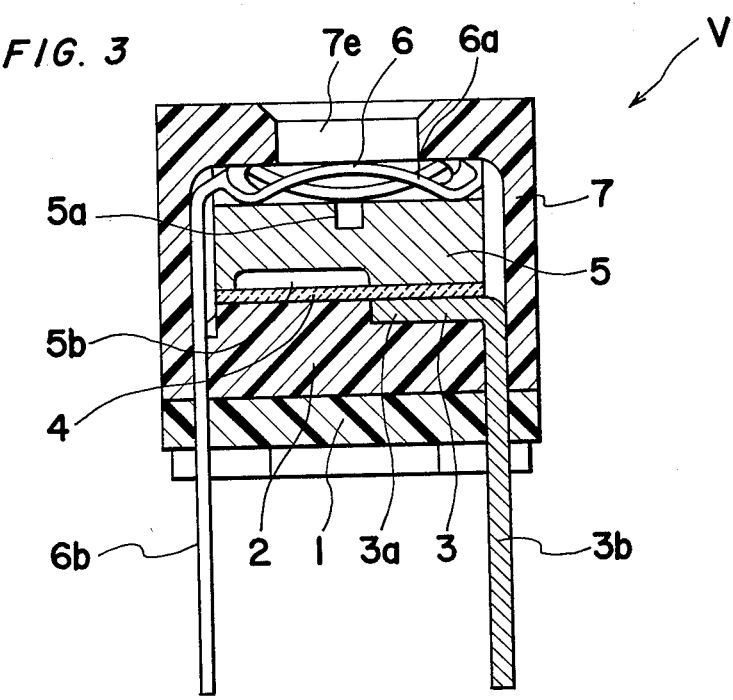
FIG. 3

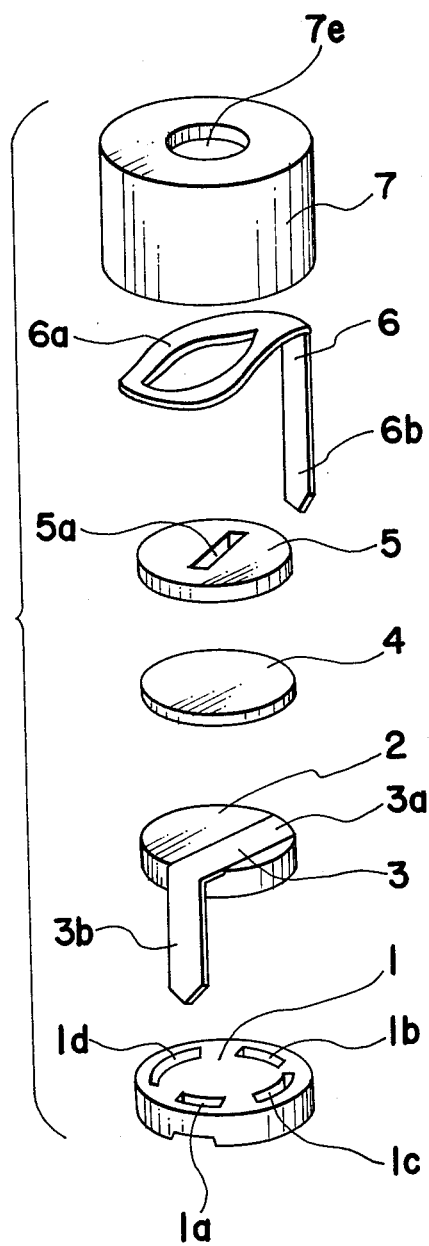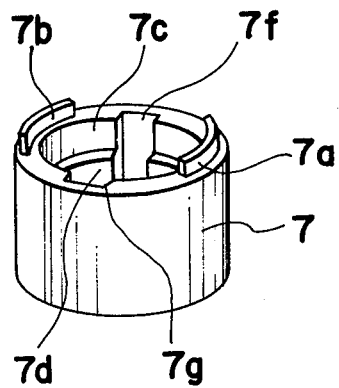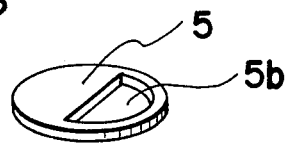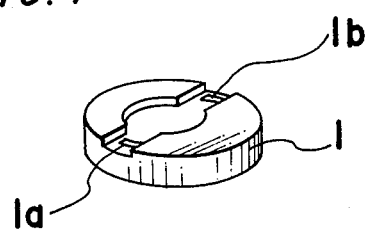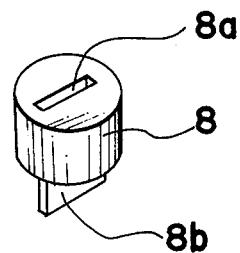

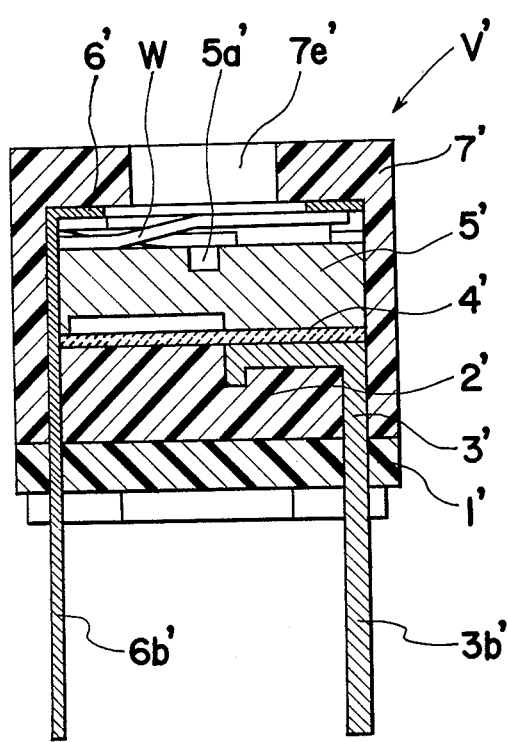
FIG. 9
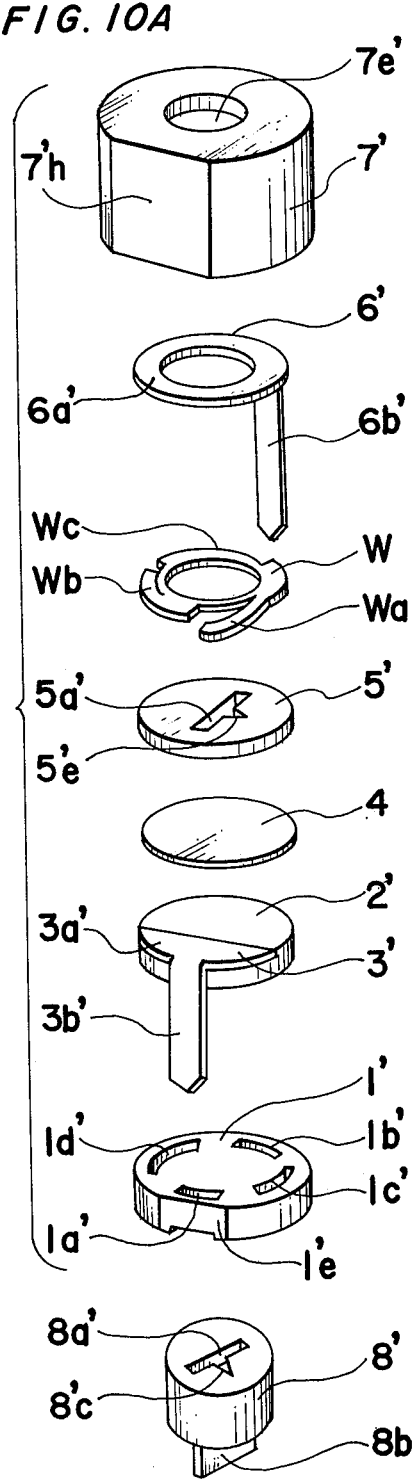
FIG. 10A
FIG. 10B

VARIABLE CAPACITOR

BACKGROUND OF THE INVENTION

The present invention relates to a capacitor and more particularly, to a variable capacitor for use in electrical and electronic equipment.

Recently, variable capacitors, especially those of extremely small sizes and yet having sufficiently large electrostatic capacity have come into wide use in various fields of electrical and electronic industries, following the miniaturization of circuit constructions of electrical and electronic equipment.

Referring to FIG. 1, there is shown one example of such conventional variable capacitors which comprises a stator S having a stator electrode $Se$ which is formed on the upper surface thereof with suitable electrode material through baking or coating. A rotor R is rotatably disposed on the stator electrode $Se$ and fixed, for example, by soldering to a rotary shaft A for rotation therewith. A rotor electrode $Re$ is formed in the recess at the upper surface of the rotor R through baking or coating of suitable electrode material. In addition, a rotor terminal lead $Rt$ having a resilient plate spring portion $Rt1$ extends over the under surface of the stator S and includes a terminal end $Rt2$ which extends downwardly from the spring portion $Rt1$. Further, a stator terminal lead $St$ soldered at an upper end thereof to the stator S and extends downwardly through the stator S. The lower end of the rotary shaft A extends through the resilient spring portion $Rt1$ of the rotor terminal lead $Rt$ and is staked thereat as shown.

Referring also to FIG. 2, the conventional variable capacitors of the above described type have various disadvantages in that if the capacitor itself is of small size, the width $l$ of the recess formed in the upper surface of the rotor R is limited in length, therefore making it impossible for the rotor electrode $Re$ to have a sufficiently large area. In addition, the thickness $t$ between the rotor electrode $Re$ and the under surface of the rotor R can not be made small enough from the viewpoint of maintaining strength of the rotor R itself. From such restrictions, it is quite difficult to provide the variable capacitors of known constructions with large electrostatic capacity. Furthermore, in the conventional variable capacitors of the above described type, troublesome procedures for the electrode formation and soldering are inevitably involved, thus it is difficult to save labor in the manufacturing processes. This results in consequently higher cost and increased probability of producing faulty products. In addition, since the rotor R is exposed, the same rotor R is liable to be damaged, especially at the electrode $Re$ thereof, during transit or incorporation into the circuit of a particular piece of equipment. Further, since the variable capacitor can not be placed in close contact with other components, miniaturization of the equipment itself is hard to be achieved, while the variable capacitor itself tends to be affected by dust and dirt.

SUMMARY OF THE INVENTION

Accordingly, an essential object of the present invention is to provide a variable capacitor for use in electrical and electronic equipment which has sufficiently large electrostatic capacity with compact size suitable for incorporation into miniaturized circuitry.

Another important object of the present invention is to provide a variable capacitor of the above described type which is simple in construction and suited for mass production at low manufacturing cost.

A further object of the present invention is to provide a variable capacitor of the above described type which is stable in function, and free from damages or influence of dust and dirt during transit or incorporation into circuits of electrical and electronic equipment.

According to a preferred embodiment of the present invention, the variable capacitor includes a stator disposed on an insulating base, a stator terminal lead having an electrode portion fixed to the stator and a terminal end extending through the insulating base. In addition, the variable capacitor includes material rotatably disposed on the stator through a dielectric plate, a rotor terminal lead having a resilient spring portion disposed over the surface of the rotor and a terminal end extending through the insulating base, and an insulating cap of hollow cylindrical shape fitted over the resilient spring portion of the rotor terminal lead and rigidly connected at its lower edge to the insulating base to house the above described components therebetween. Thus a variable capacitor of simple construction having sufficiently large electrostatic capacity which is compact in size and which is especially suitable for incorporation into miniaturized circuits is presented with a substantial elimination of disadvantages inherent in the conventional variable capacitors.

BRIEF DESCRIPTION OF THE DRAWINGS

These and other objects and features of the present invention will become apparent from the following description taken in conjunction with the preferred embodiment thereof with reference to the attached drawings in which:

FIG. 1 is a schematic side sectional view on an enlarged scale, of a prior art variable capacitor which has already been referred to;

FIG. 2 is a fragmentary view, on a still enlarged scale, of a rotor employed in the prior art variable capacitor of FIG. 1;

FIG. 3 is a schematic side sectional view, on an enlarged scale, of a variable capacitor according to one embodiment of the present invention;

FIG. 4 is an exploded view of the variable capacitor of FIG. 3;

FIG. 5 is a perspective view of an insulator cap employed in the variable capacitor of FIG. 3, with the insulator cap turned over for clarification of construction;

FIG. 6 is a perspective view of a rotor employed in the variable capacitor of FIG. 3, with the rotor turned over for clarification of construction;

FIG. 7 is a perspective view of an insulating base employed in the variable capacitor of FIG. 3, with the insulating base turned over for clarification of construction;

FIG. 8 is a perspective view of a plug which may be employed in the variable capacitor of FIG. 3;

FIG. 9 is similar view to FIG. 3, but particularly shows a modification thereof;

FIG. 10(A) is an exploded view of the modified variable capacitor of FIG. 9;

FIG. 10(B) is a perspective view of a plug which may be employed in the variable capacitor of FIG. 9;

DETAILED DESCRIPTION OF THE INVENTION

Figure 11:
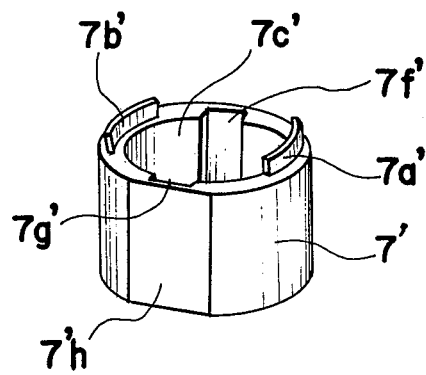
FIG. 11 is a similar view to FIG. 5, but particularly shows a modified insulating cap employed in the variable capacitor of FIG. 9.
Figure 12:
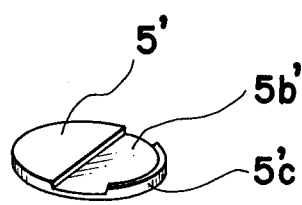
FIG. 12 is a similar view to FIG. 6, but particularly shows a modified rotor employed in the variable capacitor of FIG. 9.

Before the description of the present invention proceeds, it is to be noted that like parts are designated by like reference numerals throughout several views of the attached drawings.

Referring now to FIGS. 3 to 7, there is shown a variable capacitor V of the invention which comprises a stator 2 mounted on an insulating base 1, an L-shaped stator terminal lead 3 having a stator electrode portion 3a fixed on the surface of the stator 2 and a terminal end 3b extending downwardly through the insulating base 1. In addition, the variable capacitor includes a rotor 5 of metallic material rotatably disposed on the stator 2 through a dielectric plate 4, a rotor terminal lead 6 of approximately L-shape which has a resilient spring portion 6a disposed over the surface of the rotor 5 and a terminal end 6b extending downwardly through the base 1. Also, the variable capacitor includes and an insulating cap 7 of hollow cylindrical configuration fitted over the spring portion 6a of the terminal lead 6 and connected at the lower edge thereof with the base 1 to define a housing to enclose therein the entire capacitor assembly described above. The electrode portion 3a of the stator terminal lead 3 is embedded in the surface of the disk-like stator 2 of insulating material such as ceramics, plastics and the like by bonding or one-piece molding in such a manner that the surface of the electrode portion 3a is flush with that of the stator 2, while the thin disc-like dielectric plate 4, for example, of ceramics disposed between the stator 2 and the metallic rotor 5 provides the variable capacitor V with necessary dielectric constant. The metallic rotor 5 which should preferably be produced by press work, casting, forging, etc., at low manufacturing cost is made of electrically conductive material such as nickel alloy, brass plate or the like and has its surface finished with extremely high accuracy, for example, by lapping finish. A groove 5a is formed in the upper surface of the rotor 5 to receive a tip, for example, of a screw driver (not shown) for rotation of the rotor 5, while a semi-circular recess 5b (FIG. 6) is formed in the under surface of the same rotor 5 for the control of electrostatic capacity, which recess 5b may be replaced by an equivalent cut-out portion or the like. By the formation of such a recess or cut-out portion 5b, the confronting areas between the rotor 5 and the electrode portion 3a through the dielectric plate 4 vary upon rotation of the rotor 5, and thus the electrostatic capacity of the capacitor V can be altered as desired. The upper and under surfaces of the rotor 5 are finished extremely smooth and flat, for example, by lapping or polishing for achieving very close contact with the surface of the dielectric plate 4 and also for the improvement of slidability and electrical conductivity with respect to the resilient spring portion 6a of the rotor terminal lead 6. The rotor terminal lead 6, especially the spring portion 6a thereof for urging the rotor 5 downward toward the dielectric plate 4 is made of highly resilient metallic material such as phosphor bronze and the like, and is formed into a spring of a perforated plate-like shape having curvatures directed three ways as shown. On the other hand, the insulating base 1 composed of plastic material is formed, on the upper surface thereof, with a pair of opposed arcuate slots 1a and 1b in positions adjacent to the peripheral edge of the base 1 for inserting the terminal ends 6b and 3b of the rotor and stator terminal leads 6 and 3 therethrough, while a pair of opposed arcuate grooves 1c and 1d are formed on the same upper surface of the base 1 in positions adjacent to the slots 1a and 1b for receiving corresponding projections 7a and 7b formed on the insulating cap 7 mentioned below. The cylindrical insulating cap 7 made of plastic material reinforced by mixing glass fibers has a lower inner wall 7c of a large diameter for receiving the stator 2 therein and an upper inner wall 7d of a reduced diameter for receiving the rotatable metallic rotor 5, with the pair of opposed arcuate projections 7a and 7b being formed at the lowermost edge of the cap 7 for fitting into the mating grooves 1c and 1d of the base 1, while a through-hole 7e concentric with the cap 7 is formed on the upper surface of the cap 7 (FIG. 4). The inner walls 7c and 7d of the cap 7 are further provided with a pair of opposed grooves 7f and 7g axially formed in said walls 7c and 7d. The terminal ends 3b and 6b of the stator and rotor terminal leads 3 and 6 are respectively fitted into the grooves 7f and 7g for being positioned without any side play therein. After the projection 7a and 7b of the insulating cap 7 are inserted into the corresponding grooves 1c and 1d of the base 1, the cap 7 and base 1 are bonded to each other, for example, by ultrasonic welding or with suitable adhesives. It is to be noted that the insulating base 1 and the stator 2 may be formed as one unit with plastic material. Upon fixing the insulating cap 7 onto the insulating base 1, the stator electrode portion 3a for the stator 2, the dielectric plate 4, the metallic rotor 5 and the resilient spring portion 6a of the rotor electrode terminal lead 6 for depressing the rotor 5 are pressed against each other and enclosed in the space between the cap 7 and the base 1 to form the variable capacitor V.

By the above arrangement, when the metallic rotor 5 is rotated, with the tip of a suitable adjusting means such as a screw driver (not shown) being fitted into the groove 5a of the rotor 5, the electrostatic capacity of the capacitor V is varied through variation of the confronting areas between the portion of the metallic rotor 5 acting as a rotor electrode and the portion 3a of the stator terminal lead 3 acting as a stator electrode.

The dielectric plate 4 described as formed of ceramics in the above embodiment may be made of other materials, for example, polyethylene fluoride resin.

Similarly, the dielectric plate 4 described as formed separately in the above embodiment may be replaced by a coating of dielectric material such as polyethylene fluoride resin applied to the under surface of the metallic rotor 5.

Referring to FIG. 8, there is shown a plug 8 which may further be provided in the hole 7e of the insulating cap 7 of FIG. 3. The plug 8 of cylindrical shape having a diameter slightly smaller than that of the hole 7e for being rotatably received in the same hole 7e is provided with a groove 8a formed in the upper surface thereof for insertion of the tip of adjusting means (not shown) and a control projection 8b extending downwardly at right angles from the under surface of the plug 8 for engagement with the corresponding groove 5a of the rotor 5. Upon insertion of the plug 8 into the hole 7e, the variable capacitor V is perfectly closed and insulated from any other components which may be incorporated in the applicable circuits.

As is clear from the foregoing description, according to the variable capacitor of the invention, since no central shaft is required, with the dielectric plate being disposed between the metallic rotor and the stator electrode, the thickness of the dielectric plate is made extremely small, while enough area is available for obtaining sufficiently large electrostatic capacity despite its compact size. Furthermore, in the variable capacitor of the present invention, part of the metallic rotor forms the electrode, and the electrode portion 3a of the electrode terminal lead 3 is formed by press work, so that correction of the electrode area is readily effected depending on necessity. The while the dielectric plate is separately formed and easily corrected for its thickness, thus the disadvantage in the conventional variable capacitors wherein the correction of electrode area is quite difficult due to baking or coating of the electrode material onto the electrodes is completely eliminated. The variable capacitor of the present invention has a uniform maximum and minimum electrostatic capacity, which is advantageous.

It is another advantage of the variable capacitor of the present invention that since the troublesome processes for electrode formation and soldering which are required in the conventional variable capacitors are dispensed with, the variable capacitor of the present invention can be easily assembled by mere insertion of various components into the space between the insulating cap and the base. The above arrangement is particularly advantageous in that no particular skill is required on the part of workers in the production, which consequently results in a reduction in manufacturing cost. In addition, in the variable capacitor of the invention, since the rotor, dielectric plate, stator, etc., are incorporated in the insulated casing including the insulating cap and the base, the variable capacitor is not affected by any outside impacts, and may be incorporated into applicable circuits in close contact with other components, and thus contributes much to the miniaturization of the equipment, while being hardly affected by dust and dirt.

Referring now to FIGS. 9 to 14, there is shown a modification of the variable capacitor V of FIGS. 3 to 8. In this modification, the variable capacitor V' is generally similar in construction to the embodiment of FIGS. 3 to 8, but further improvements are made in the main components thereof as described hereinbelow.

Figure 14:
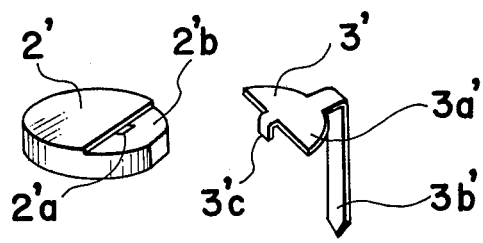
FIG. 14 is a perspective view explanatory of a combination of the stator and the stator terminal lead employed in the variable capacitor of FIG. 9.

In the modified variable capacitor V', the stator 2', for example, of steatite, is formed on its upper surface with a semi-circular stepped portion 2'b having a through-hole 2'a (FIG. 14). The stator electrode terminal lead 3' has a semi-circular electrode portion 3a' corresponding in shape to the stepped portion 2'b of the stator 2' and having a positioning projection 3'c mating with the through-hole 2'a of the stator 2'. In fixing the terminal lead 3' to the stator 2', the electrode portion 3a' of the lead 3' is accurately positioned by mere insertion of the projection 3'c into the through-hole 2'a of the stator 2', with simultaneous bonding of the electrode portion 3a' to the stepped portion 2'b by suitable adhesives or one-piece molding, thus resulting in further improvement of working efficiency.

Figure 13:
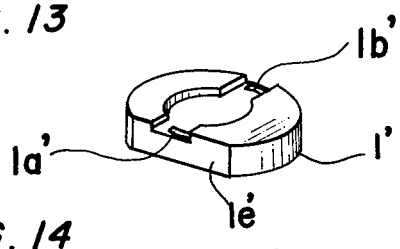
FIG. 13 is a similar view to FIG. 7, but particularly shows a modified insulating base employed in the variable capacitor of FIG. 9.
Figure 15:
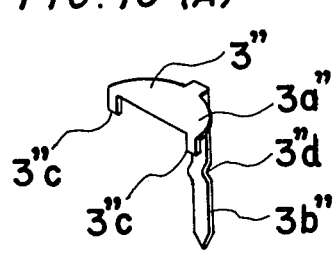
FIG. 15(A) is a perspective view showing a further modification of the stator terminal lead employable in the variable capacitor of FIG. 9.
FIG. 15(B) is a perspective view showing a modification of the insulating base, stator and stator terminal lead assembly which may be employed in the variable capacitor of FIG. 9.
Figure 15:
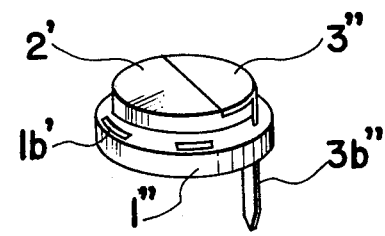

It should be noted here that the insulating base 1', the stator 2', the stator electrode terminal lead 3' and the insulating base 1' may be integrally formed, for example, by one-piece molding as in FIG. 15(B), in which case, the stator electrode terminal lead 3'' as shown in FIG. 15(A) should preferably be employed. The stator electrode terminal lead 3'' of non-ferrous material such as brass or of nickel alloys and the like has a pair of spaced positioning projections 3''c formed at opposite ends of the front edge of the semi-circular electrode portion 3a''. The terminal end 3b'' thereof is provided with a bent portion 3''d, and when molded as one-piece with the stator 2' and the insulating base 1'', not only the costs involved for manufacturing such components separately and for assembling the same are reduced, but the mechanical strength of the stator terminal lead 3'' against the outside impacts within the molded resin is highly increased. On the other hand, the metallic rotor 5' which should preferably be made at low manufacturing cost through press work, casting, forging and the like in a smaller manner as the rotor 5 of FIGS. 3 and 4. The groove 5a' formed on the upper surface of the rotor for rotation of the same is provided, at the central portion thereof, with an arrow-shaped making 5'e for identification of the directional property or polar orientation. The semi-circular recess 5b described as formed in the under surface of the rotor 5 of FIG. 6 is replaced by an equivalent stepped portion 5b' of similar semi-circular shape, with an arcuate projection 5'c being formed at the peripheral edge of the stepped portion 5b' as shown. Similarly to the semi-circular recess 5b in the rotor 5 of FIG. 6, the provision of the semi-circular stepped portion 5b' in the rotor 5', the confronting areas between the rotor 5' and the electrode portion 3a' through the dielectric plate 4 can be varied for the alteration of the electrostatic capacity, in which case the minimum capacity is reduced with the decrease in size of the arcuate projection 5'c. In the modified variable capacitor V' of FIGS. 9 and 10, the rotor terminal lead 6 described as having the resilient spring portion 6a in the capacitor V of FIGS. 3 to 8 is replaced by the rotor terminal lead 6' having a flat ring-shaped portion 6a'. A spring washer W whose portion adjacent to the peripheral edges thereof is cut and bent slightly downwardly at three places to form resilient tongues Wa, Wb, and Wc as shown is disposed between the under surface of the ring-shaped portion 6a' of the rotor terminal lead 6' and the upper surface of the metallic rotor 5' for urging the rotor 5' downward. It should be noted here that the combination of the rotor terminal lead 6' and the spring washer W may be replaced by the single rotor terminal lead 6 having the resilient spring portion 6a as employed in the embodiment of FIGS. 3 to 8, in which case further simplification is achieved, since the terminal end 6 and the spring portion 6a can be formed as one-piece by press work or the like. In the insulating cap, the stepped inner walls 7c and 7d described as formed in the insulating cap 7 of FIG. 5 is replaced by a wall 7c', with the opposed grooves 7f and 7g' for the terminal ends 3b' and 6b' being formed in the wall 7c'. A flat surface 7'h is axially formed on the outer periphery of the cap 7' as shown in FIGS. 10 and 11. It is to be noted that the insulating base 1' is also provided with a corresponding flat portion 1'e at the outer pheriphery thereof as shown in FIGS. 10 and 13. Such a flat portion 7'h is not only effective for identification of polar orientation or directional property, for example, for setting of positions for maximum capacity and minimum capacity, but facilitates application of suction means thereto, such as a vacuum chuck (not shown) and the like. More specifically, the variable capacitor V' placed in a predetermined position is conveniently picked up by the vacuum chuck applied to the flat surface 7'h through absorption, and transferred to a place for insertion, for example, in a base of an applicable circuit, with subsequent releasing thereof from the vacuum, thus contributing much to labor saving in the manufacturing process. It is to be noted that the plug 8' which may be inserted into the hole 7e' of the insulating cap 7' is further provided, at the central portion of the groove 8a', with an arrow-shaped marking 8'c for identification of directional property.

Other constructions, functions and features of the modified variable capacitor V' of FIGS. 9 to 15(B) are similar to those in the variable capacitor V of FIGS. 3 to 8 including its assembling method, so that detailed description thereof is abbreviated for brevity.

It is to be noted that in the foregoing embodiments, although the variable capacitor is mainly described with reference to those of extremely compact sizes for incorporation into miniaturized electrical and electronic equipment, the concept of the present invention is readily applicable to variable capacitors of large sizes widely employed in electrical and electronic equipment in general.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A variable capacitor for use in electrical and electronic equipment comprising:
    a substantially circular disc-like stator member of electrically insulating plastic material to which a stator electrode is secured thereto, said stator electrode including a stator terminal end and a stator terminal lead which form a single monolithic element;
    a rotor member of electrically conductive material including one surface which mates with and is rotatably disposed on a dielectric member, said dielectric member being positioned adjacent to said stator member;
    said one surface of said rotor member including a cut out portion acting as a rotor electrode for alteration of electrostatic capacity upon rotation of said rotor member through variation of confronting areas between said rotor member and said stator electrode;
    said dielectric member being a plate member of dielectric ceramic material separately formed and disposed between said rotor member and said stator electrode;
    a contact member including a rotor terminal end and a rotor terminal lead which form a single monolithic element, said contact member being positioned adjacent said rotor member and being adapted to urge said rotor member towards said dielectric member and said stator member;
    said stator member, stator electrode, dielectric member, rotor member and contact member being housed in a substantially cylindrical casing of electrically insulating plastic material except for said stator terminal end and said rotor terminal end, said substantially cylindrical casing being firmly affixed to said stator member and including a through opening in a top thereof;
    said substantially cylindrical casing being closed at a bottom thereof by an electrically insulating plastic base which includes openings therethrough to accommodate said stator terminal end and said rotor terminal end; and
    said rotor member being adapted to be rotated by inserting an adjusting means through said through opening in the top of said casing to engage a groove in the rotor member which includes a marking for identification of directional property.

2. A variable capacitor as claimed in claim 1, wherein said substantially cylindrical casing is provided with a flat portion having a predetermined area on a peripheral surface thereof.

3. A variable capacitor as claimed in claim 1, wherein said substantially cylindrical casing is further provided with adjusting means comprising a plug member associated with said rotor member for rotating said rotor member through rotation of said plug member.

4. A variable capacitor as claimed in claim 1, wherein said stator member is disposed on said separate base of electrically insulating material which forms part of said casing.

5. A variable capacitor as claimed in claim 1, wherein said stator member is provided with an opening, on one surface thereof, which mates with a corresponding projection formed on said stator electrode of said stator terminal lead for positioning of said stator electrode on said stator member.

6. A variable capacitor as claimed in claim 1, wherein said dielectric member is a coating of dielectric material applied to said one surface of said rotor member.

7. A variable capacitor is claimed in claim 1, wherein said dielectric member is of polyethylene fluoride resin.

8. A variable capacitor as claimed in claim 1, wherein said rotor member is produced by press work.

9. A variable capacitor as claimed in claim 1, wherein said rotor member is produced by casting.

10. A variable capacitor as claimed in claim 1, wherein said rotor member is produced by forging.

11. A variable capacitor as claimed in claim 1, wherein said contact member is a plate spring member integrally formed with said rotor terminal end.

12. A variable capacitor as claimed in claim 1, wherein said contact member is further provided with a spring washer member disposed between said contact member and said rotor member.

13. A variable capacitor as claimed in claim 1, wherein said stator member is integrally formed with a base member of electrically insulating material which forms part of said substantially cylindrical casing and wherein said electrode is secured to said stator member by one-piece molding.

* * * * *